(12) United States Patent
Stransky-Heilkron

(10) Patent No.: US 10,257,223 B2
(45) Date of Patent: Apr. 9, 2019

(54) SECURED HOME NETWORK

(71) Applicant: Nagravision S.A., Cheseaux-sur-Lausanne (CH)

(72) Inventor: Philippe Stransky-Heilkron, Cheseaux (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 217 days.

(21) Appl. No.: 14/976,441

(22) Filed: Dec. 21, 2015

(65) Prior Publication Data
US 2017/0180395 A1   Jun. 22, 2017

(51) Int. Cl.
*H04L 29/06* (2006.01)
*H04W 12/12* (2009.01)

(52) U.S. Cl.
CPC ........ *H04L 63/145* (2013.01); *H04L 63/1416* (2013.01); *H04W 12/12* (2013.01)

(58) Field of Classification Search
CPC ............... H04L 63/145; H04L 63/1416; H04L 63/1425; H04L 63/0236; H04L 63/1433; H04L 67/02; H04L 69/22; H04L 2463/144; G06F 21/552; H04W 12/12
See application file for complete search history.

(56) References Cited

U.S. PATENT DOCUMENTS

| | | | | |
|---|---|---|---|---|
| 8,555,388 B1* | 10/2013 | Wang | ................. | H04L 63/1416 709/245 |
| 9,143,522 B2* | 9/2015 | Wang | ................. | H04L 63/1416 |
| 9,609,015 B2* | 3/2017 | Natarajan | ................ | G06F 21/53 |
| 9,667,657 B2* | 5/2017 | Efremov | ............. | H04L 67/1008 |
| 9,705,919 B1* | 7/2017 | Jacobsen | ................. | H04L 63/20 |
| 9,710,646 B1* | 7/2017 | Zhang | ...................... | G06F 21/56 |
| 9,749,336 B1* | 8/2017 | Zhang | ...................... | H04L 63/14 |
| 9,762,596 B2* | 9/2017 | Wang | ................. | H04L 63/1416 |
| 2004/0268141 A1 | 12/2004 | Wiederin et al. | | |
| 2013/0061326 A1* | 3/2013 | Bennett | .................... | G06F 21/51 726/24 |
| 2014/0090059 A1* | 3/2014 | Wang | .................. | H04L 63/1416 726/23 |
| 2014/0237599 A1 | 8/2014 | Gertner et al. | | |

(Continued)

OTHER PUBLICATIONS

International Search Report and Written Opinion for PCT App No. PCT/IB2016/057733 dated Mar. 17, 2017, 13 pgs.

*Primary Examiner* — Don G Zhao
(74) *Attorney, Agent, or Firm* — Polsinelli LLP

(57) ABSTRACT

Malware detection logic executed by a secured device residing in a home network may receive a message from an unsecured device of a first unsecured network and intended for a destination device of the home network, the destination device comprising a security client. The malware detection logic may establish a secure communication channel between the malware detection logic of the secured device and the security client of the destination device. The malware detection logic may execute a validation test on the message to determine that the message includes malware. The malware detection logic may report an alarm to the security client of the destination device. The malware detection logic may transmit information related to the malware to a cloud computing server. The malware detection logic may prevent an application associated with the destination device from processing the message.

21 Claims, 10 Drawing Sheets

(56) References Cited

U.S. PATENT DOCUMENTS

2015/0319182 A1* 11/2015 Natarajan ............... G06F 21/53
    726/24
2016/0156644 A1* 6/2016 Wang .................. H04L 63/1416
    726/23
2016/0342531 A1* 11/2016 Sharma ............... G06F 12/1408
2017/0180378 A1* 6/2017 Tyler ....................... H04L 63/10

* cited by examiner

SECURED HOME NETWORK

TECHNICAL FIELD

The present disclosure is generally related to home networks, and is more specifically related to systems and methods for providing protection to home networks.

BACKGROUND

Many homes are equipped with home networks. Most frequently, the home network may be an IEEE 802.11 (WiFi) network provided by and installed by a cable television provider, a fiber optic telephone service provider, a satellite network service provider, etc. Devices may be connected in the home network through a router, which provides connectivity with one or more external networks. The router may be provided with encryption software for encrypting messages with compatible devices that also employ the same type of encryption using an encryption client.

Unfortunately, home networks provided with encryption software may still be subject to attacks, leading users to feel that their home network is exposed and unsecure. It is difficult for the users of home networks to install and maintain tools available to restore trust, e.g., firewalls, antivirus, etc. In addition, many users do not have sufficient expertise to install, maintain, and configure these tools. This leads to additional user distrust when the user desires to install devices such as baby cams, web cams, door and window security systems, etc., that can be pirated. Users may be very hesitant to add unsecure devices to their home network. Users do not want to see their baby-cam or door and window security system hacked.

DETAILED DESCRIPTION

As used herein, malware may refer to any software used to disrupt computer operations, gather sensitive information, or gain access to private computer systems. Malware may be defined by its malicious intent, acting against the requirements of the computer user, and does not include software that causes unintentional harm due to some deficiency. 'Malware' is an umbrella term used to refer to a variety of forms of hostile or intrusive software, including, but not limited to computer viruses, worms, Trojan horses, ransomware, spyware, adware, scareware, and other malicious programs. It can take the form of executable code, scripts, active content, and other software.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Figure 1:
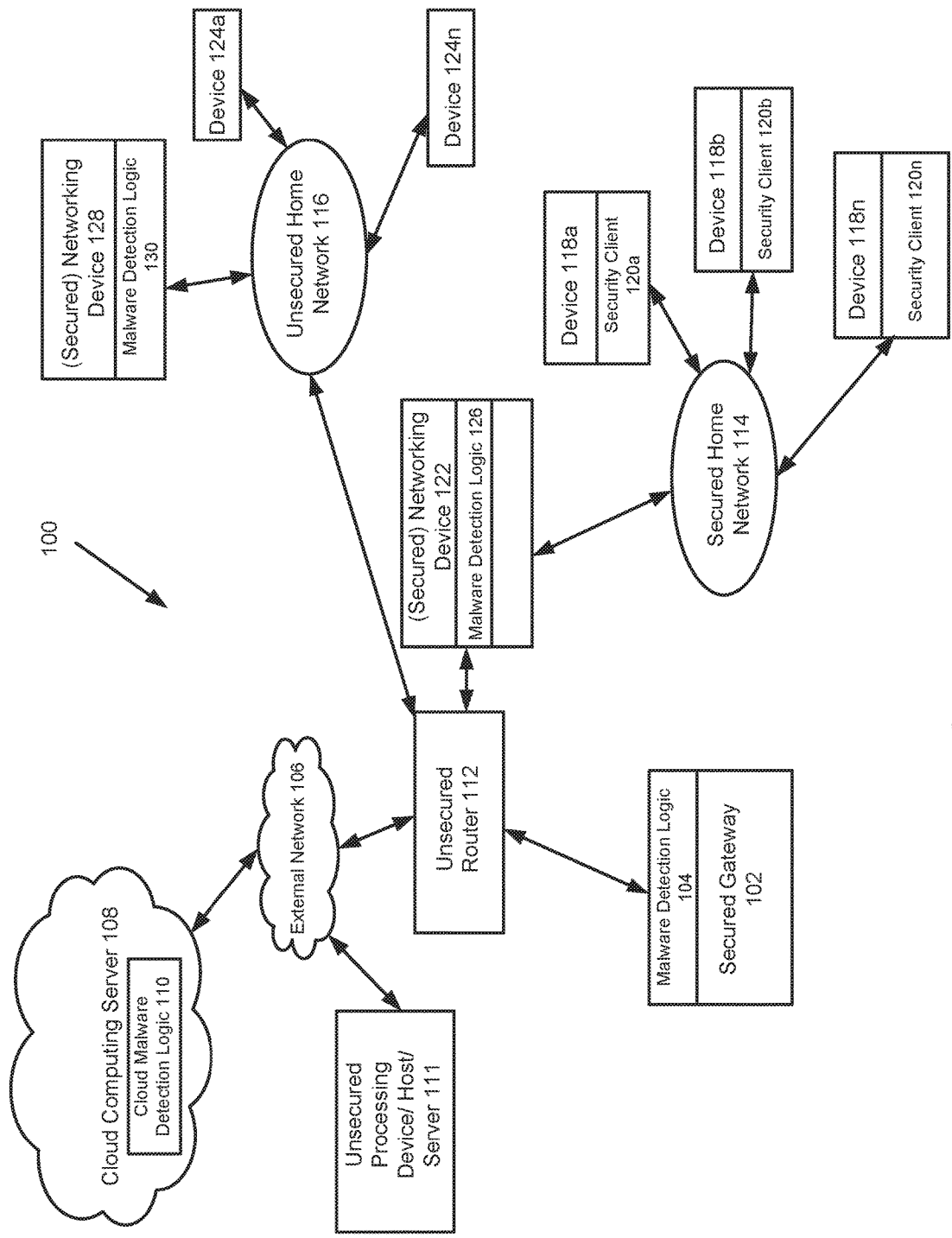
FIG. 1 is a block diagram that illustrates an example network in which examples of the present disclosure may operate.

FIG. 1 is a block diagram that illustrates an example network 100 in which examples of the present disclosure may operate. The network 100 may include a secured processing device/host/server 102 (hereinafter the "secured gateway 102") provided with malware detection logic 104, according to examples of the present disclosure. As used herein, malware detection logic may refer to processing logic intended to detect the presence of malware. The terms "computer", "computer platform", processing device, host, server are intended to include any data processing device, such as a desktop computer, a laptop computer, a tablet computer, a mainframe computer, a server, a handheld device, a digital signal processor (DSP), an embedded processor (an example of which is described in connection with FIG. 10), or any other device able to process data. The computer/computer platform is configured to include one or more microprocessors communicatively connected to one or more non-transitory computer-readable media and one or more networks. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

The secured gateway 102 may be communicatively connected to an unsecured external network 106, such as the Internet, to one or more unsecured processing devices/hosts/servers 111, and to a cloud computing system/server 108 (hereinafter the "cloud computing server 108") having cloud malware detection logic 110 thereon. The secured gateway 102 may be communicatively connected to the unsecured external network 106 by a router 112 provided by a cable, fiber, satellite, etc. based Internet service provider. The router 112 may be configured to have one or more encryption protocols (not shown) and/or malware detection software (not shown).

The network 100 may further include a secured home sub-network 114 (hereinafter the "secured home network 114") and an unsecured home sub-network 116 (hereinafter the "unsecured home network 116") communicatively connected to the unsecured external network 106. The secured home network 114 may include one or more devices 118a-118n, wherein all of the one or more secured devices 118a-118n are provided with security clients 120a-120n. The secured home network 114 may be further provided with a networking device 122 having malware detection logic 126, through which the one or more secured devices 118a-118n may communicate with the external network 106 directly or through the router 112. The unsecured home network 116 may include one or more unsecured devices 124a-124n, wherein at least one of the untrusted devices 124a-124n is not provided with a security client and hence may be referred to as an unsecured device (e.g., 124a). The one or more secured devices 118a-118n and the one or more unsecured devices 124a-124n may include, but are not limited to, advanced sensors, cameras, Internet-of-Things machines, home appliance, etc. The unsecured home network 116 may include a networking device 128 having malware detection logic 130, through which the one or more unsecured devices 124a-124n may communicate with the external network 106 directly or through the router 112.

The malware detection logic 104, 110, 126, 130 and the security clients 120a-120n may have one or more components of a type of firewall and security layer (hereinafter a "Security Wall") configured to perform a plurality of malware detection, protection, and other security functions including, but not limited to, one or move validation tests comprising at least one of a port verification, content verification for virus detection, a deep packet inspection for detection of known attacks, or generation of alarms. In one example, the security clients 120a-120n may be further configured to receive only encrypted message. The malware detection logic 104, 110, 126, 130 and the security clients 120a-120n may be implemented in either hardware as an external device or in software as a plug-in, installed, or downloaded module.

The Security Wall may be configured to provide a secure booting process, a secure download process, and/or a generation process for generating one or more keys for encrypting messages. The Security Wall may be configured to encrypt/decrypt messages to create a secure channel between less-powerful Security Wall-equipped security clients (e.g., 120a), to provide communication channels between various instances of the Security Wall in the network 100, for dynamic reaction and threat reporting, communicated between the Security Wall and cloud services provided by the cloud malware detection logic 110 residing on the cloud server 108 when more detailed expertise is required, and rerouting of messages/streams through the cloud malware detection logic 110 residing on the cloud server 108 for threat detection or highly sensitive data transfer.

The malware detection logic 104 executed by a secured device (e.g., the secured gateway 102) residing in the network 100 may be configured to receive a message from an unsecured device (e.g., the router 112) of a first network (e.g., the untrusted external network 106) intended for a destination device (e.g., 118a or 102) of the home network (e.g., the secured home network 114). The destination device (e.g., 118a or 102) may comprise a security client (e.g., 120a). The malware detection logic 104 may be configured to establish a secure communication channel between the malware detection logic 104 of the secured device (e.g., the secured gateway 102) and the security client (e.g., 120a) of the destination device (e.g., 118a or 102). The malware detection logic 104 may be configured to execute a validation test on the message to determine that the message includes malware. The malware detection logic may be configured to report an alarm to the security client (e.g., 120a) of the destination device (e.g., 118a or 102). The malware detection logic 104 may be configured to transmit information related to the malware to the cloud malware detection logic 110 of the cloud computing server 108. The malware detection logic 104 may be configured to prevent an application associated with the destination device (e.g., 118a or 102) from processing the message.

The secured device (e.g., the secured gateway 102) may transmit the message over the secured home network 114 to the destination device (e.g., 118a). Before transmitting the message, the malware detection logic 104 may encrypt the message.

In another example, the application may reside on the secured device (e.g., the secured gateway 102).

The malware detection logic 104 may conduct one or more validation tests comprising at least one of a port verification, content verification for virus detection, or a deep packet inspection for detection of known attacks. The malware detection logic 104 may transmit an indication of the presence of the malware to the cloud malware detection logic 110 of the cloud computing server 108.

The malware detection logic 104 may transmit an alarm indicative of the presence of the malware to the security client (e.g., 120a) of the destination device (e.g., 118a).

The malware detection logic 104 may be operable to provide one or more of a secure booting process, a secure download process, or a generation process for generating one or more keys for encrypting the message.

The secured device (e.g., the secured gateway 102) may be configured to receive a message from an unsecured device (e.g., the router 112) of a first network (e.g., the unsecured external network 106) intended for a destination device (e.g., 118a or 102) of the home network (e.g., the secured home network 114), wherein the determination of the presence of malware is made by the cloud malware detection logic 110 of the cloud computer server 108. The malware detection logic 104 executed by the secured device (e.g., the secured gateway 102) residing in the network 100, may receive the message intended for the destination device (e.g., 118a or 102) of the network 100. If the malware detection logic 104 decides not to determine whether the message includes malware, then the malware detection logic 104 may be configured to transmit the message to cloud malware detection logic 110 of the cloud computing server 108.

The malware detection logic 104 may determine that the secured device (e.g., the secured gateway 102) has insufficient processing power or needs more expertise to determine whether the message includes malware. In an example, the malware detection logic 104 may receive an indication (e.g., from one of the secured device (e.g., the secured gateway 102, the cloud computing server 108, the networking device 124, or one of the security clients 120a-120n)) that an alert level of the secured home network 114 has increased. The determination of whether the message includes malware may be based on the security sensitivity of one of the secured device (e.g., the secured gateway 102), the cloud computing server 108, the networking device 124, or one of the security clients 120a-120n.

The malware detection logic 104 may be configured to receive from the cloud malware detection logic 110 of the cloud computing server 108, an indication that the message contains malware. The malware detection logic 104 may be configured to report an alarm to the security client (e.g., 120a) of the destination device (e.g., 118a). The malware detection logic 104 may be configured to prevent an application (not shown) associated with the destination device (e.g., 118a) from processing the message. The malware detection logic 104 may be configured to receive from the cloud malware detection logic 110 of the cloud computing server 108, an indication that the message does not contain malware. Accordingly, the malware detection logic 104 may be configured to permit the application associated with the destination device (e.g., 118a) to process the message.

The secured device (e.g., the secured gateway 102) may transmit the message over the secured home network 114 to the destination device (e.g., 118a). Before transmitting the message, the malware detection logic 104 may encrypt the message. The application may reside on the secured device (e.g., the secured gateway 102).

The malware detection logic 104 of the secured device (e.g., the secured gateway 102 and/or the cloud malware detection logic 110 of the cloud computing server 108) may conduct one or move validation tests comprising at least one of a port verification, content verification for virus detection, or a deep packet inspection for detection of known attacks.

The malware detection logic 104 of the secured device (e.g., the secured gateway 102) may transmit an indication of the presence of the malware to the cloud malware detection logic 110 of the cloud computing server 108. In an example, the malware detection logic 104 may transmit an alarm indicative of the presence of the malware to the security client (e.g., 120a) of the destination device (e.g., 118a).

The malware detection logic 104 may be operable to provide one or more of a secure booting process, a secure download process, or a generation process for generating one or more keys for encrypting the message.

The malware detection logic 104 of the secured device (e.g., the secured gateway 102) may be configured to route all incoming messages received from the router 112 and originating in the untrusted external network 106 to the cloud malware detection logic 110 of the cloud computing server 108. In one example, the malware detection logic 104 of the secured device (e.g., the secured gateway 102) routing all incoming messages may be the result of the sensitivity of the security client (e.g., 120a), or because the alert level of the network has been increased. As used herein, sensitivity may be determined by the type of device and/or by the consequence of a successful attack. For example, a door lock has a higher sensitivity than a webcam, because a successful attack on the door lock may result in opening the door to intruders. A heating regulator in Canada may have higher sensitivity in winter than in summer. If the heating is stopped in winter, the water pipes may freeze and become damaged. The same regulator in Florida may be less sensitive. The alert level may be increased by security services located in the cloud computing server 108 as a result of monitoring activities of the cloud malware detection logic 110.

A first secured device (e.g., the secured gateway 102) having malware detection logic 104 may configure a secure communication session with a second secured device (e.g., the device 118b) having a security client (e.g., 120b). The malware detection logic 104 executed by the first secured device (e.g., the secured gateway 102) residing in the network 100, may receive the message intended for the second secured device (e.g., 118b) of the network 100 from an unsecured device (e.g., the server 111) of an untrusted network (e.g., the external network 106). The malware detection logic 104 may be configured to establish a secure communication channel with the second secured device (e.g., 118b) in view of a security level associated with the malware detection logic 104 or a threat level associated with the message. The malware detection logic 104 may employ at least one of a session key creation mechanism, creating one or more certificates, a cloud-generated session key, or one or more home domain keys.

The malware detection logic 104 may be configured to receive an indication that the security level associated with the malware detection logic 104 or the threat level associated with the message has changed. The security level change may be the result of one or more alarms triggered by the detection of the presence of malware in the message or a change in the secured home network 114 requiring new authentication. The malware detection logic 104 may be configured to discontinue a session associated with the secure communication channel in view of the indication. The malware detection logic 104 may be configured to prevent an application (not shown) of a secured device (e.g., the device 118b) from processing the message.

If the malware detection logic 104 determines that the session associated with the secure communication channel is to continue in view of the indication, then the malware detection logic 104 may permit the application of the second secured device (e.g., the device 118b) to process the message. The secured gateway 102 may transmit the message over the secured home network 114 to the second secured device (e.g., the device 118b). In an example, before the first secured device (e.g., the secured gateway 102) transmits the message, the malware detection logic 104 may encrypt the message.

The malware detection logic 104 may be configured to report the creation of the session to the cloud malware detection logic 110 of the cloud computing server 108. The malware detection logic 104 may be configured to provide approval to start the session. In an example, providing approval may be based on a security level of the secured home network 114 or a security sensitivity of the secured device (e.g., the secured gateway 102) or the second secured device (e.g., the device 118b).

During the session, the malware detection logic 104 of the secured gateway 102 may be informed about the security level of its correspondents (e.g., 118a-118n) and may decide if the session can continue or if the session is to be interrupted based on the security level. For example, the security level can be a consequence of alarms triggered during the execution of the setup in the examples above. In another example, the security level may change if there is a change in the environment that requires a new authentication. The change in the environment may be triggered by messages issued by the cloud malware detection logic 110.

Figure 2:
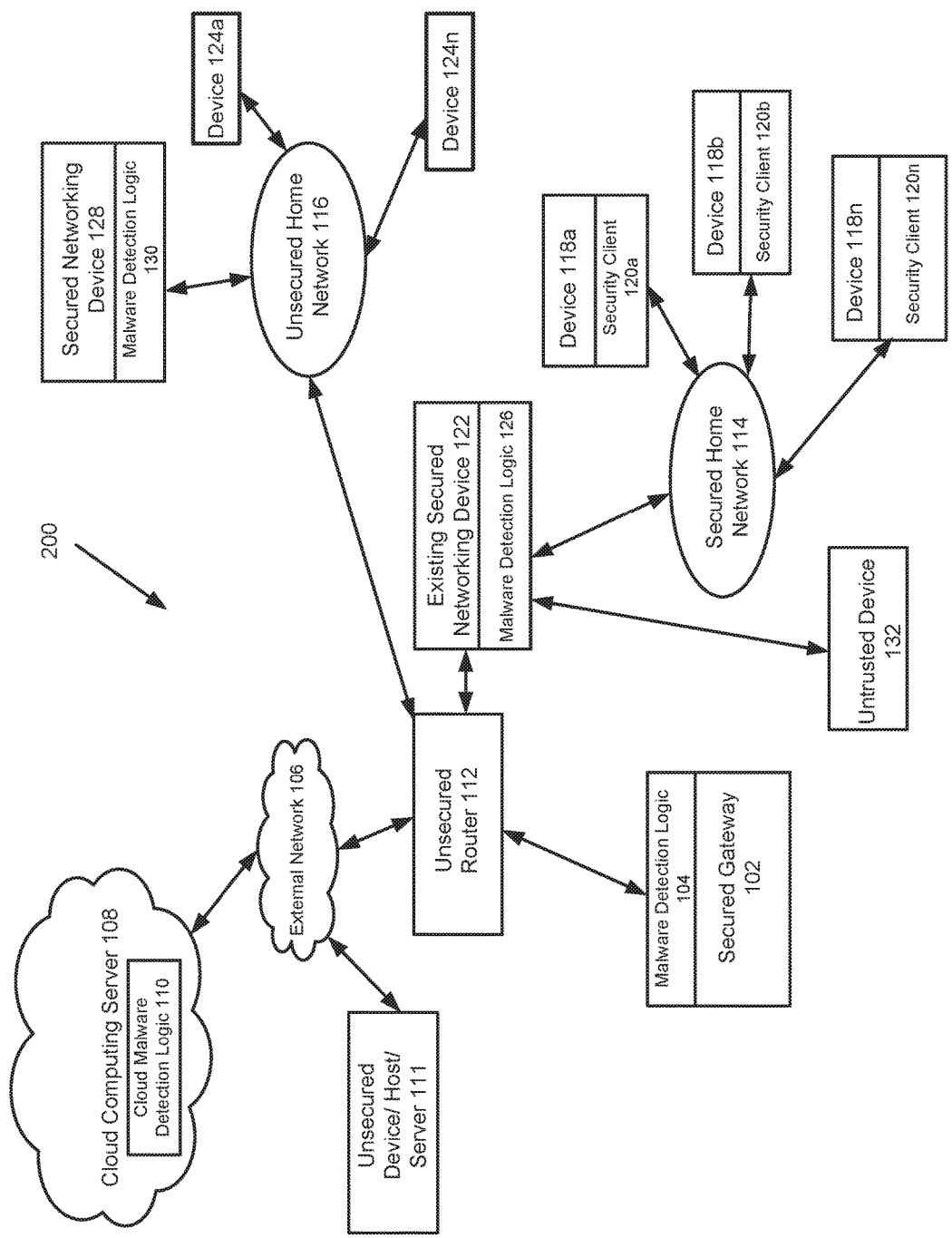
FIG. 2 is a block diagram of the elements of FIG. 1 adapted to add an unsecured device to a trusted home network, wherein messages are routed through an existing device having malware detection logic in the trusted home network.

FIG. 2 is a block diagram of the elements of FIG. 1 adapted for adding an unsecured device 132 to the secured home network 114, wherein messages are routed through an existing secured device (e.g., the networking device 122) having malware detection logic 126 in the secured home network 114. In an example, malware detection logic 126 of the existing secured device (e.g., the networking device 124) in the secured home network 114 may be configured to receive an identifier associated with an unsecured device (e.g., 132) of the secured home network 114. The malware detection logic 126 may be configured to inform one or more other secured devices (e.g., 118*a*-118*n*, 102) in the secured home network 114 to re-route messages through the malware detection logic 126 of the existing device (e.g., the networking device 122) in the secured home network 114 in view of the identifier. The malware detection logic 126 may receive a message intended for the unsecured device (e.g., 132) from one of the one or more other secured devices (e.g., 118*a*) in the secured home network 114. The malware detection logic 126 may be configured to execute a validation test on the message to determine whether the message includes malware. The malware detection logic 126 may transmit the message to the cloud malware detection logic 110 of the cloud computing server 108 and receive from the cloud malware detection logic 110 of the cloud computing server 108 an indication of whether the message includes malware. The malware detection logic 126 may conduct one or more validation tests comprising at least one of a port verification, content verification for virus detection, or a deep packet inspection for detection of known attacks. The malware detection logic 126 may transmit an indication of the presence of the malware to a cloud computing server 108.

If the malware detection logic 126 determines that the message does not include malware, then the malware detection logic 126 may transmit the message over the secured home network 114 to the unsecured device (e.g., 132). If the malware detection logic 126 determines that the message does include malware, then the malware detection logic 126 does not transmit the message over the secured home network 114 to the unsecured device (e.g., 132).

The malware detection logic 126 may report the presence of the unsecured device (e.g., 132) to the cloud malware detection logic 110 of the cloud computing server 108.

Before the malware detection logic 126 transmits the message to the unsecured device (e.g., 132), the malware detection logic 126 may be configured to encrypt the message.

The malware detection logic 126 may route all communications to the cloud malware detection logic 110 of the cloud computing server 108, for recording, inspection, logging, etc.

Figure 3:
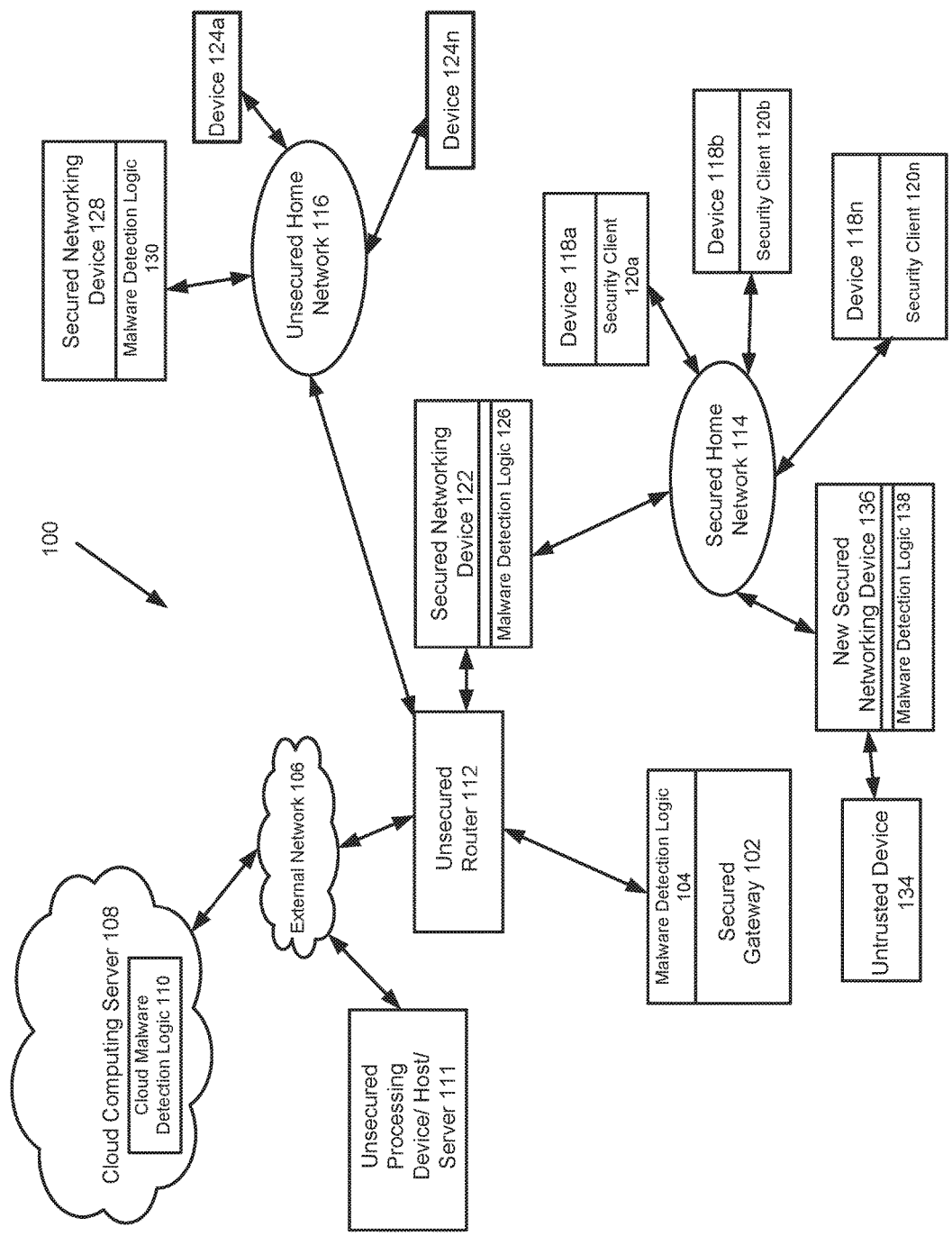
FIG. 3 is a block diagram of the elements of FIG. 1 adapted to add an unsecured device to a trusted home network, wherein messages are routed through a new device having malware detection logic in the trusted home network.

FIG. 3 is a block diagram of the elements of FIG. 1 adapted to add an unsecured device 134 to the secured home network 114, wherein messages are routed through a secured device (e.g., 136) having malware detection logic (e.g., 138) in the secured home network 114. An unsecured device (e.g., 132, e.g., a baby cam) may be inserted in the secured home network 114. The secured device (e.g., 136) having malware detection logic (e.g., 138) is added to the secured home network 114. The malware detection logic (e.g., 138) of the secured device (e.g., 136) may be configured to receive an identifier associated with the unsecured device 134 inserted in the secured home network 114. The malware detection logic (e.g., 138) of the secured device (e.g., 136) may be configured to inform one or more other secured devices (e.g., 118*a*-118*n*) in the secured home network 114 to re-route messages through the malware detection logic (e.g., 138) of the secured device (e.g., 136) in view of the identifier. The malware detection logic (e.g., 138) of the secured device (e.g., 136) may be configured to receive a message intended for the unsecured device 134 from one of the one or more other secured devices (e.g., 118*a*) in the secured home network 114. The malware detection logic (e.g., 138) of the secured device (e.g., 136) may be configured to execute a validation test on the message to determine whether the message includes malware.

If the malware detection logic (e.g., 138) of the secured device (e.g., 136) determines that the message does not include malware, then the malware detection logic 138 of the secured device 136 transmits the message over the secured home network 114 to the unsecured device 134. If the malware detection logic 138 of the secured device 136 determines that the message does include malware, then the malware detection logic 138 of the new secured device 136 does not transmit the message over the secured home network 114 to the unsecured device 134. The malware detection logic 138 may be configured to report the presence of the new networking device 136 to the cloud malware detection logic 110 of the cloud computing server 108.

The malware detection logic 138 may transmit the message to the cloud malware detection logic 110 of the cloud computing server 108 and receive from the cloud malware detection logic 110 of the cloud computing server 108 an indication of whether the message includes malware.

Before the malware detection logic 138 of the secured device 134 transmits the message, the malware detection logic 138 of the new secured device 136 may be configured to encrypt the message.

The malware detection logic 138 of the secured device 136 may conduct one or more validation tests comprising at least one of a port verification, content verification for virus detection, or a deep packet inspection for detection of known attacks.

The malware detection logic 138 may transmit an indication of the presence of the malware to the cloud malware detection logic 110 of the cloud computing server 108.

Referring to FIG. 1, a configuration of a secured device (e.g., the secured gateway 102) may change in the secured home network 114. The malware detection logic (e.g., 104) executed by the secured device (e.g., the secured gateway 102) in the secured home network 114 may be configured to receive an indication that a first signature associated with the secured device (e.g., of the secured gateway 102) has changed in view of a change in configuration of the secured device (e.g., the secured gateway 102). The malware detection logic (e.g., 104) executed by a secured device (e.g., the secured gateway 102) may be configured to calculate a second signature associated with the secured device (e.g., of the secured gateway 102) in view of the indication. The malware detection logic (e.g., 104) may be configured to transmit the second signature to malware detection logic 110 of the cloud computing server 108. The malware detection logic (e.g., 104) may be configured to receive from the malware detection logic 110 of the cloud computing server 108 an update of a security status of the secured device (e.g., the secured gateway 102) in view of the second signature.

The first signature may be determined based on a configuration of the secured device (e.g., of the secured gateway 102), one or more features of secured device (e.g., of the secured gateway 102), or one or more behaviors of the secured device (e.g., of the secured gateway 102). The malware detection logic 110 of the cloud computing server 108 receives and prohibits further communications with the secured device (e.g., the secured gateway 102).

The malware detection logic 110 of the cloud computing server 108 may inform other secured devices (e.g., 118a-118n) in the secured home network 114 about the change in security status of the secured device (e.g., the secured gateway 102). As a result, the other secured devices (e.g., 118a-118n) in the secured home network 114 may take one or more individual actions. Example of what actions the other secured devices (e.g., 118a-118n) may take may include, but are not limited to, deciding to stop communicating with the secured device (e.g., the secured gateway 102), reinitialize the communication with the secured device (e.g., the secured gateway 102), reset themselves and/or rollback to a known configuration or to known parameters, etc. The individual action may lead to the malware detection logic 110 of the cloud computing server 108 prohibiting any further communications (e.g., by the other secured devices (118a-118n)) with the secured device that was modified (e.g., the secured gateway 102).

Figure 4:
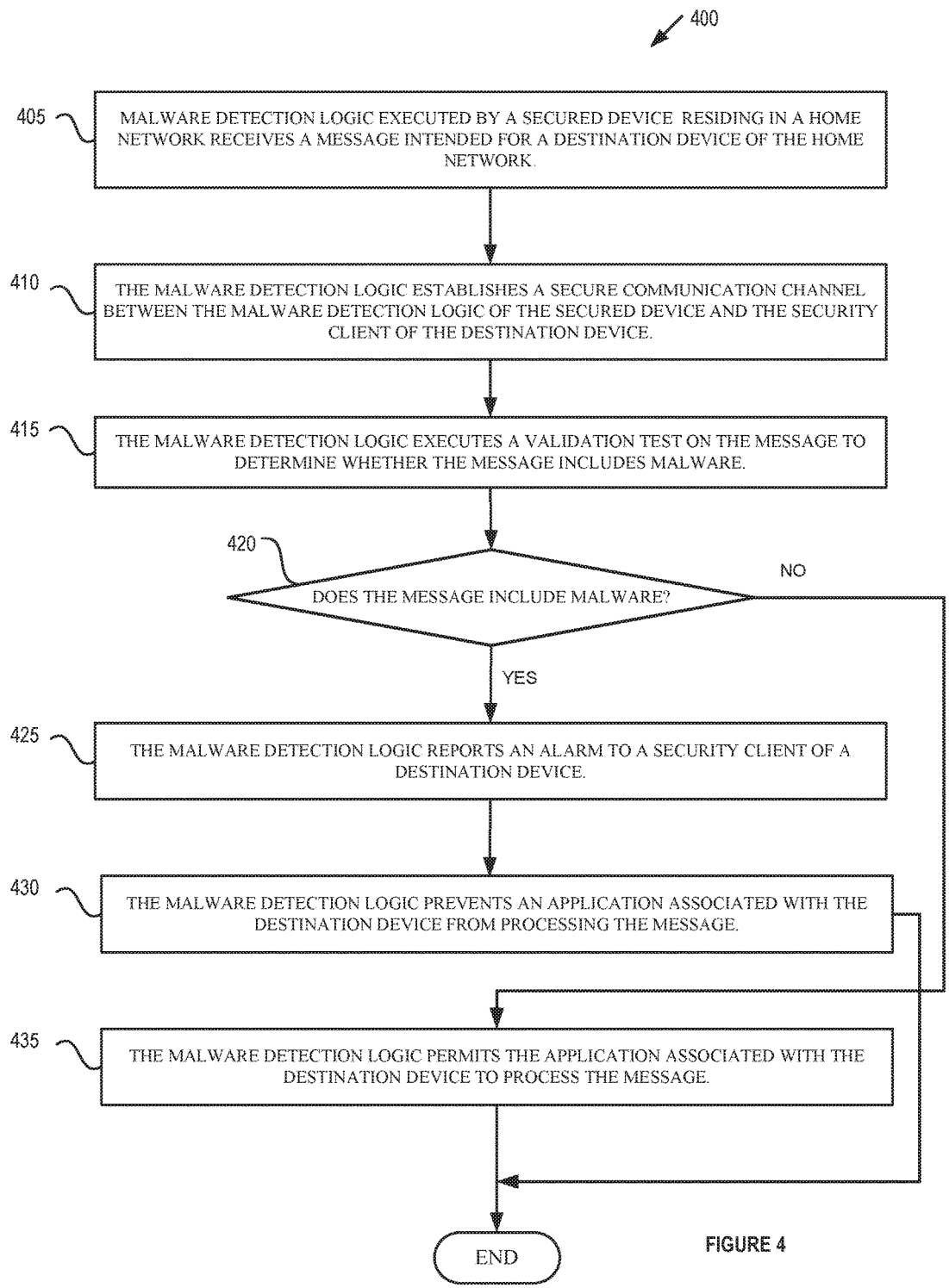
FIG. 4 is a diagram illustrating an exemplary method to permit a secured device of FIG. 1 to receive a message from an unsecured device of a first network and intended for a destination device of the home network of FIG. 1, wherein the determination of the presence of malware is made by malware detection logic executed by a processing device (e.g., a gateway server).

FIG. 4 is a diagram illustrating an exemplary method 400 to permit a secured device (e.g., the secured gateway 102) of FIG. 1 to receive a message from an unsecured device (e.g., the server 111) of a first network (e.g., the untrusted external network 106) and intended for a destination device (e.g., 118a or 102) of the home network (e.g., the secured home network 114), wherein the determination of the presence of malware is made by the malware detection logic 104 executed by a processing device of a secured device (e.g., the secured gateway 102). The method 400 may be performed by malware detection logic (e.g., 104) of the secured device (e.g., the secured gateway 102) of FIG. 1 and may comprise hardware (e.g., circuitry, dedicated logic, programmable logic, microcode, etc.), software (e.g., instructions run on a processing device), or a combination thereof.

As shown in FIG. 4, at block 405, the malware detection logic 104 executed by the secured device (e.g., the secured gateway 102) residing in the network 100, may receive the message intended for the destination device (e.g., 118a or 102) of the network 100. The destination device (e.g., 118a or 102) may comprise a security client (e.g., 120a). At block 410, the malware detection logic 104 may establish a secure communication channel between the malware detection logic 104 of the secured device (e.g., the secured gateway 102) and the security client (e.g., 120a) of the destination device (e.g., 118a). At block 415, the malware detection logic 104 may execute a validation test on the message to determine whether the message includes malware. If, at block 420, the malware detection logic 104 determines that the message includes malware, then at block 425, the malware detection logic 104 may report an alarm to the security client (e.g., 120a) of the destination device (e.g., 118a). The malware detection logic 104 may transmit information related to the malware to a cloud computing server 108. At block 430, the malware detection logic 104 may prevent an application (not shown) associated with the destination device (e.g., 118a) from processing (e.g., receiving, reading, extracting information from, and/or executing portions of, etc.) the message. If, at block 420, the malware detection logic 104 determines that the message does not include malware, then at block 435, the malware detection logic 104 may permit the application associated with the destination device (e.g., 118a) to process the message.

Permitting the application to process the message may comprise transmitting, by the secured device (e.g., the secured gateway 102), the message over the secured home network 114 to the destination device (e.g., 118a). Before transmitting the message, the malware detection logic 104 may encrypt the message. The application may reside on the secured device (e.g., the secured gateway 102).

The malware detection logic 104 may conduct one or more validation tests comprising at least one of a port verification, content verification for virus detection, or a deep packet inspection for detection of known attacks. In another example, the malware detection logic 104 may transmit an indication of the presence of the malware to the cloud malware detection logic 110 of the cloud computing server 108.

The malware detection logic 104 may transmit an alarm indicative of the presence of the malware to the security client (e.g., 120a) of the destination device (e.g., 118a).

The malware detection logic 104 may provide one or more of a secure booting process, a secure download process, or a generation process for generating one or more keys for encrypting the message.

Figure 5:
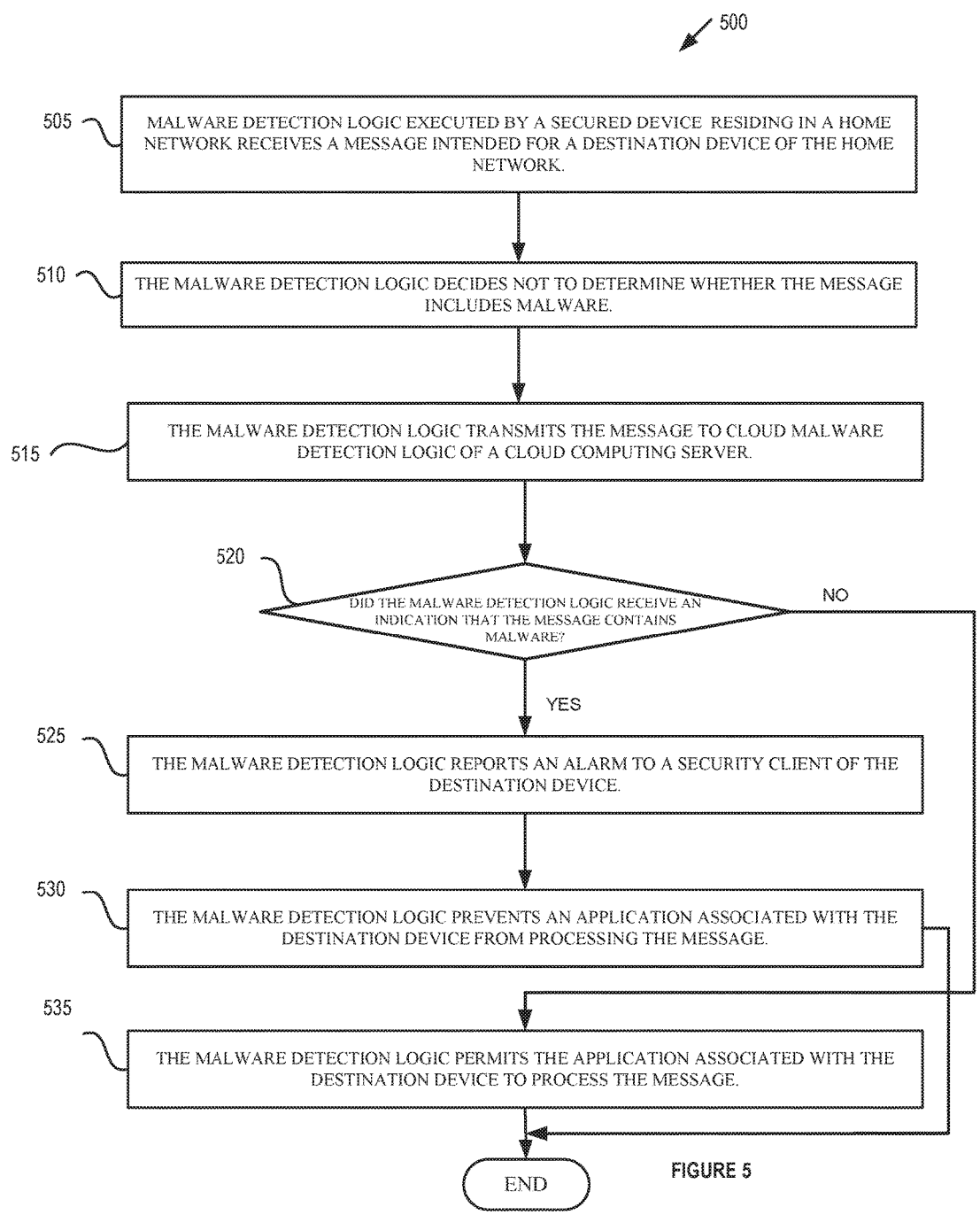
FIG. 5 is a diagram illustrating an exemplary method to permit a secured device of FIG. 3 to receive a message from an unsecured device of a first network and intended for a destination device of the home network of FIG. 1, wherein the determination of the presence of malware is made by cloud malware detection logic of the cloud computer server.

FIG. 5 is a diagram illustrating an exemplary method 500 to permit the secured device (e.g., the secured gateway 102 of FIG. 1) to manage communication between an unsecured device (e.g., 122) of a first network (e.g., the external network 106) and a destination device (e.g., 118a) of a home network (e.g., the secured home network 114). The method 500 may be performed by malware detection logic (e.g., 104) of the secured device (e.g., the secured gateway 102) of FIG. 1 and may comprise hardware (e.g., circuitry, dedicated logic, programmable logic, microcode, etc.), software (e.g., instructions run on a processing device), or a combination thereof.

As shown in FIG. 5, at block 505, malware detection logic 104 executed by a secured device (e.g., the secured gateway 102) residing in a home network (e.g., the secured home network 114) receives message intended for the destination device (e.g., 118a or 102) of the home network (e.g., the secured home network 114). At block 510, the malware detection logic 104 decides not to determine whether the message includes malware. At block 915, the malware detection logic 104 may transmit the message to cloud malware detection logic 110 of the cloud computing server 108.

The malware detection logic 104 may determine that the secured device (e.g., the secured gateway 102) has insufficient processing power or needs more expertise to determine whether the message includes malware. The malware detection logic 104 may receive an indication (e.g., from one of the secured device (e.g., the secured gateway 102), the cloud computing server 108, the networking device 124, or one of the security clients 120a-120n) that an alert level of the secured home network 114 has increased. The determination of whether the message includes malware may be based on the security sensitivity of one of the secured device (e.g., the secured gateway 102), the cloud computing server 108, the networking device 124, or one of the security clients 120a-120n.

If, at block 520, the malware detection logic 104 receives from the cloud malware detection logic 110 of the cloud computing server 108, an indication that the message contains malware, then at block 525, the malware detection logic 104 may report an alarm to the security client (e.g., 120a) of the destination device (e.g., 118a). At block 530, the malware detection logic 104 may prevent an application (not shown) associated with the destination device (e.g., 118a) from processing the message. If, at block 520, the malware detection logic 104 receives from the cloud malware detection logic 110 of the cloud computing server 108, an indication that the message does not contain malware, then at block 535, the malware detection logic 104 may permit the application associated with the destination device (e.g., 118*a*) to process the message.

A secured device (e.g., the secured gateway 102) may transmit the message over the secured home network 114 to the destination device (e.g., 118*a*). In an example, before transmitting, the message, the malware detection logic 104 may encrypt the message. The application may reside on the secured device (e.g., the secured gateway 102).

The malware detection logic 104 of the secured device (e.g., the secured gateway 102), and/or the cloud malware detection logic 110 of the cloud computing server 108 may conduct one or more validation tests comprising at least one of a port verification, content verification for virus detection, or a deep packet inspection for detection of known attacks.

The malware detection logic 104 of the secured device (e.g., the secured gateway 102) may transmit an indication of the presence of the malware to the cloud malware detection logic 110 of the cloud computing server 108. In an example, the malware detection logic 104 may transmit an alarm indicative of the presence of the malware to the security client (e.g., 120*a*) of the destination device (e.g., 118*a*).

The malware detection logic 104 may be operable to provide one or more of a secure booting process, a secure download process, or a generation process for generating one or more keys for encrypting the message.

The malware detection logic 104 of the secured device (e.g., the secured gateway 102), may be configured to route all incoming messages received from the router 112 and originating in the unsecured external network 106 to the cloud malware detection logic 110 of the cloud computing server 108. In one example, routing all incoming messages may be the result of the sensitivity of the security client (e.g., 120*a*), or because the alert level of the network has been increased. Alert level can be increased by the security services located in the cloud computing server 108 as a result of monitoring activities of the cloud malware detection logic 110.

Figure 6:
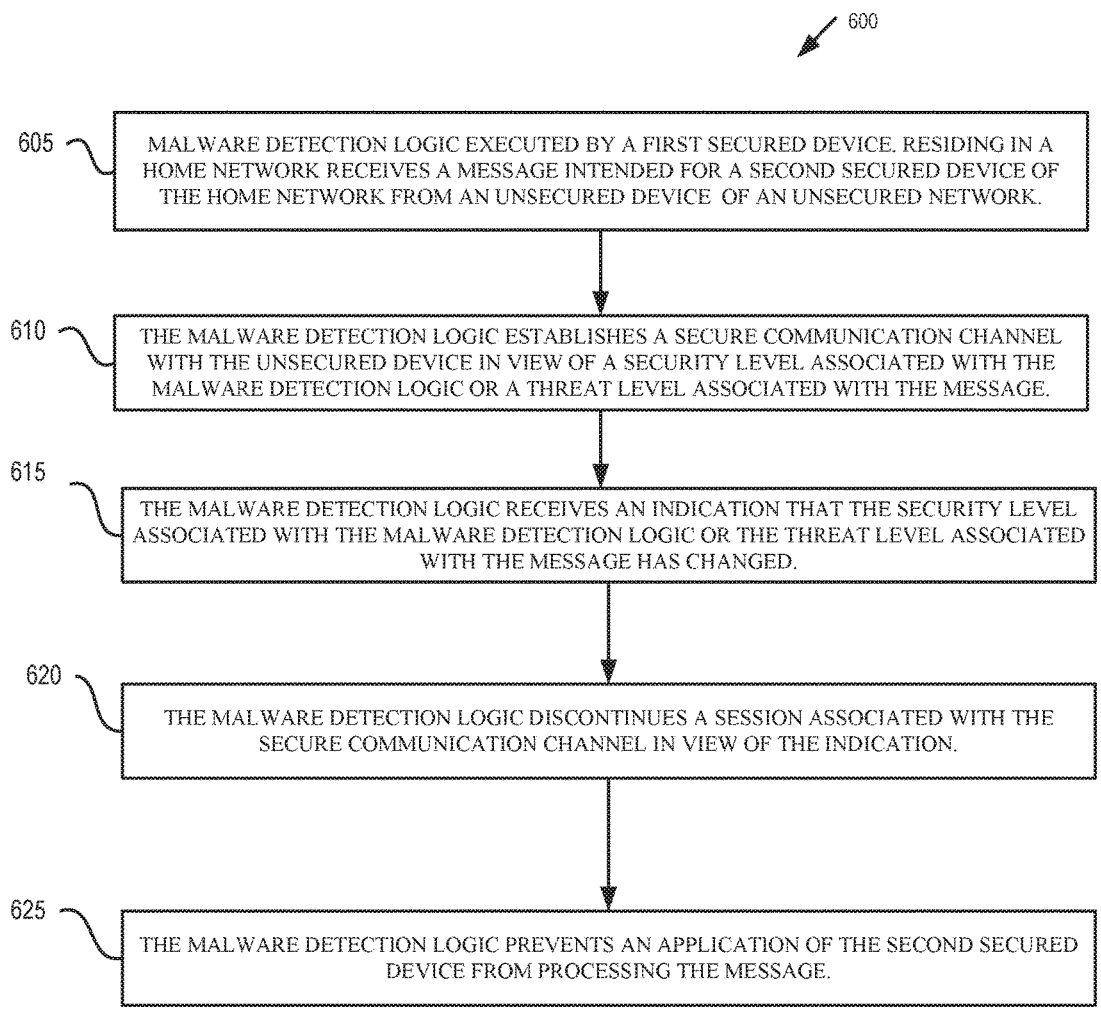
FIG. 6 is a diagram illustrating an exemplary method to configure a secure communication session between two devices in the network of FIG. 1, a first device (e.g., the gateway server) having malware detection logic and a second device having a security client.

FIG. 6 is a diagram illustrating an exemplary method 600 to configure a secure communication session between two secured devices in the network of FIG. 1, a first secured device (e.g., the secured gateway 102) having malware detection logic 104 and a second secured device (e.g., the device 118*b*) having a security client (e.g., 120*b*). The method 600 may be performed by malware detection logic (e.g., 104) of the first secured device (e.g., the secured gateway 102) of FIG. 1 and may comprise hardware (e.g., circuitry, dedicated logic, programmable logic, microcode, etc.), software (e.g., instructions run on a processing device), or a combination thereof.

As shown in FIG. 6, to setup a secure communication session between two secured devices in the network of FIG. 1, at block 605, the malware detection logic 104 executed by the first secured device (e.g., the secured gateway 102), residing in the network 100, may receive the message intended for the second secured device (e.g., 118*b*) of the network 100 from an unsecured device (e.g., 122) of an untrusted network (e.g., the external network 106). At block 610, the malware detection logic 104 may establish a secure communication channel with the unsecured device (e.g., the server 111) in view of a security level associated with the malware detection logic 104 or a threat level associated with the message. The malware detection logic 104 may employ at least one of a session key creation mechanism, creating one or more certificates, a cloud-generated session key, or one or more home domain keys.

At block 615, the malware detection logic 104 may receive an indication that the security level associated with the malware detection logic 104 or the threat level associated with the message has changed. The security level change may be the result of one or more alarms triggered by the detection of the presence of malware in the message or a change in the secured home network 114 requiring new authentication. At block 620, the malware detection logic 104 may discontinue a session associated with the secure communication channel in view of the indication. At block 625, the malware detection logic 104 may prevent an application (not shown) of the second secured device (e.g., 118*b*) from processing the message.

If the malware detection logic 104 determines that the session associated with the secure communication channel is to continue in view of the indication, then the malware detection logic 104 may permit the application of the second secured device (e.g., 118*b*) to process the message. The first secured device (e.g., the secured gateway 102), may transmit the message over the secured home network 114 to the second secured device (e.g., 118*b*). In an example, before the first secured device (e.g., the secured gateway 102) transmits the message, the malware detection logic 104 may encrypt the message.

The malware detection logic 104 may report the creation of the session to the cloud malware detection logic 110 of the cloud computing server 108. The malware detection logic 104 may give approval to start the session. Giving approval may be based on a security level of the secured home network 114 or a security sensitivity of the secured gateway 102 or the second secured device 118*b*.

During the session, the malware detection logic 104 of the first secured device (e.g., the secured gateway 102), may be informed about the security level of its correspondents (e.g., 118*a*-118*n*) and may decide if the session can continue and/or if the session is to be interrupted based on the security level. For example, the security level can be a consequence of alarms triggered in during the execution of the setup of FIG. 2 or 3. In another example, the security level may change if there is a change in the environment that may require new authentication.

Figure 7:
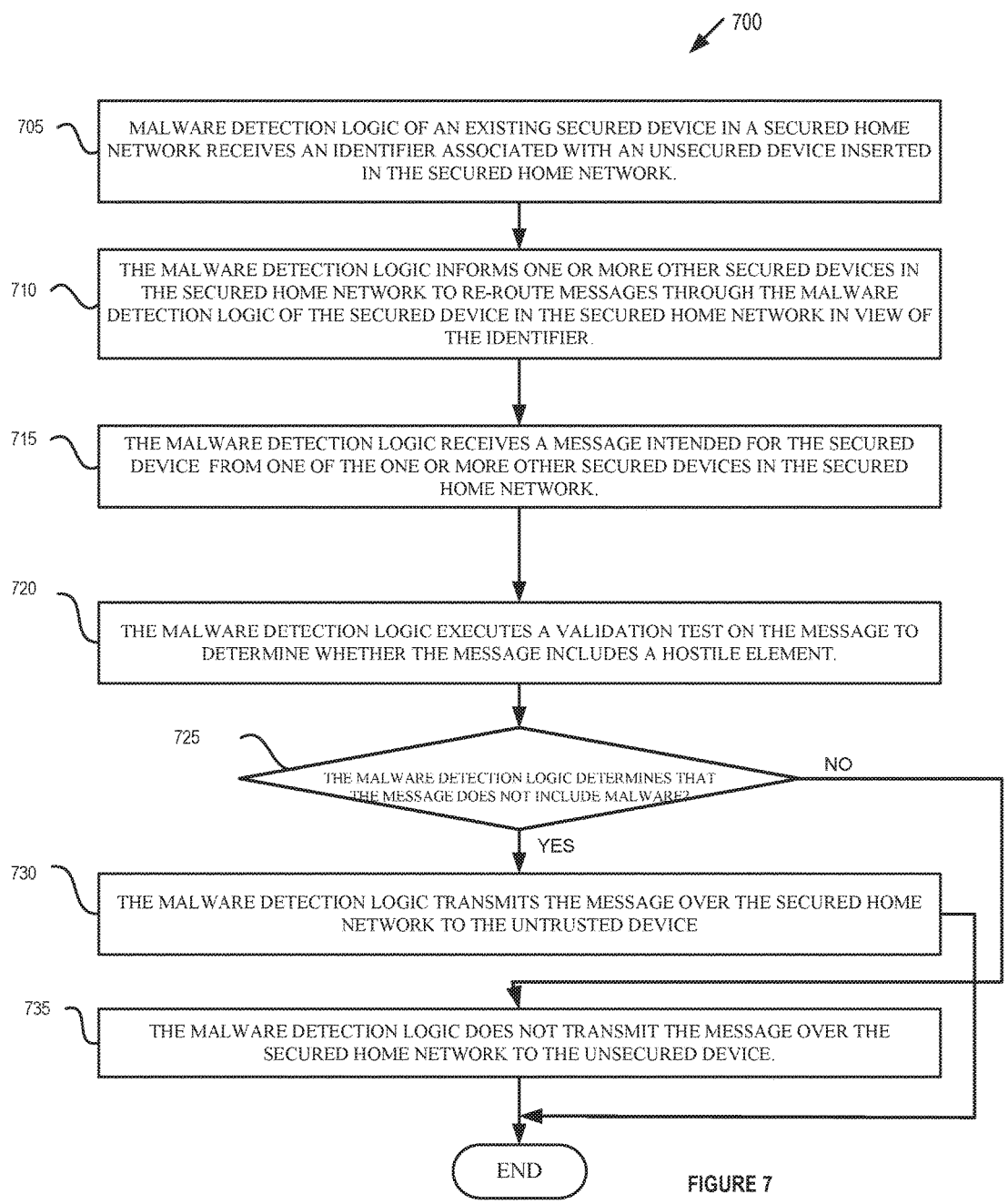
FIG. 7 is a diagram illustrating an exemplary method to add an unsecured device to a home network of FIG. 2, wherein messages are routed through an existing device (e.g., a networking device) having malware detection logic in the home network.

FIG. 7 is a diagram illustrating an exemplary method 700 to add an unsecured device (e.g., 122) to a home network (e.g., the secured home network 114) of FIG. 2, wherein messages are routed through a secured device (e.g., the networking device 124) having malware detection logic (e.g., 116) in home network (e.g., the secured home network 114). The method 600 may be performed by malware detection logic (e.g., 116) of the secured device (e.g., the networking device 124) of FIG. 2 and may comprise hardware (e.g., circuitry, dedicated logic, programmable logic, microcode, etc.), software (e.g., instructions run on a processing device), or a combination thereof.

As shown in FIG. 7, at block 705, the malware detection logic 126 of the secured device (e.g., the networking device 124) in the secured home network 114 may be receive an identifier associated with an unsecured device (e.g., 128) inserted in the secured home network 114. At block 710, the malware detection logic 126 may inform one or more other secured devices (e.g., 118*a*-118*n*, 102) in the secured home network 114 to re-route messages through the malware detection logic 126 of the secured device (e.g., the networking device 124) in the secured home network 114 in view of the identifier. At block 715, the malware detection logic 126 may receive a message intended for the unsecured device (e.g., 128) from one of the one or more other secured devices (e.g., 118*a*) in the secured home network 114. At block 720, the malware detection logic 126 may execute a validation test on the message to determine whether the message includes malware. The malware detection logic 126 may transmit the message to the cloud malware detection logic 110 of the cloud computing server 108 and receive from the cloud malware detection logic 110 of the cloud computing server 108 an indication of whether the message includes malware. The malware detection logic 126 may conduct one or more validation tests comprising at least one of a port verification, content verification for virus detection, or a deep packet inspection for detection of known attacks. The malware detection logic 126 may transmit an indication of the presence of the malware to a cloud computing server 108.

If, at block 725, the malware detection logic 126 determines that the message does not include malware, then at block 730, the malware detection logic 126 may transmit the message over the secured home network 114 to the unsecured device (e.g., 128). If, at block 725, the malware detection logic 126 determines that the message does include malware, then at block 735, the malware detection logic 126 does not transmit the message over the secured home network 114 to the unsecured device (e.g., 128).

The malware detection logic 126 may report the presence of the unsecured device (e.g., 128) to the cloud malware detection logic 110 of the cloud computing server 108.

Before the malware detection logic 126 transmits the message to the unsecured device (e.g., 128), the malware detection logic 126 may be configured to encrypt the message.

The malware detection logic 126 may route all communications to the cloud malware detection logic 110 of the cloud computing server 108, for recording, inspection, logging, etc.

Figure 8:
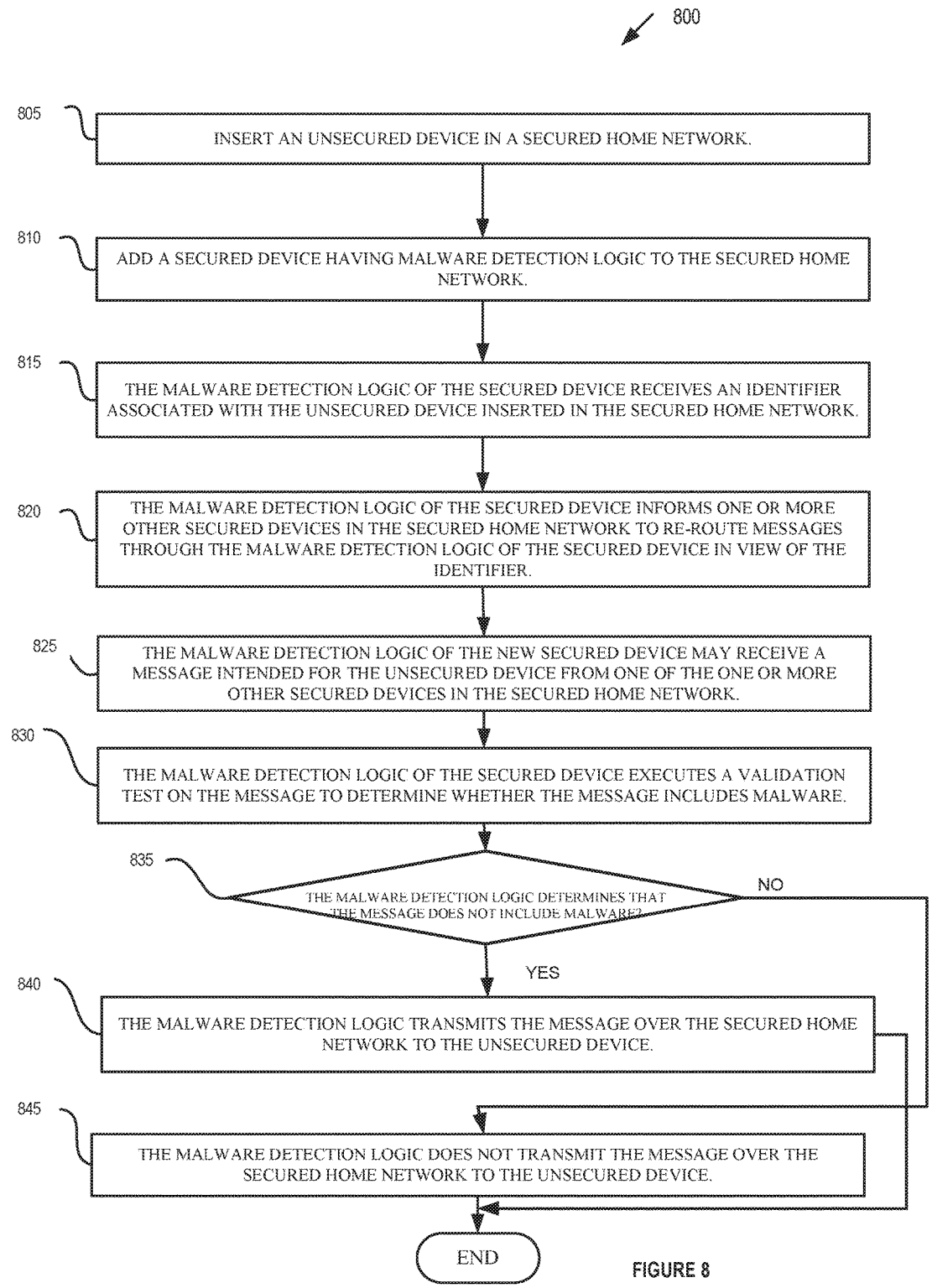
FIG. 8 is a diagram illustrating an exemplary method to add an unsecured device to the home network of FIG. 3, wherein messages are routed through a new secured device having malware detection logic in the home network.

FIG. 8 is a diagram illustrating an exemplary method 800 to add an unsecured device (e.g., 132) to a home network (e.g., the secured home network 114), wherein messages are routed through a new secured device (e.g., 136) having malware detection logic (e.g., 132) in the home network (e.g., the secured home network 114). The method 800 may be performed by the secured device (e.g., 136) having malware detection logic (e.g., 134) of FIG. 3 and may comprise hardware (e.g., circuitry, dedicated logic, programmable logic, microcode, etc.), software (e.g., instructions run on a processing device), or a combination thereof.

As shown in FIG. 8, at block 805, an unsecured device (e.g., 132, e.g., a baby cam) is inserted in the secured home network 114. At block 810, the secured device (e.g., 136) having malware detection logic (e.g., 138) is added to the secured home network 114. At block 815, the malware detection logic (e.g., 138) of the secured device (e.g., 136) may receive an identifier associated with the unsecured device 132 inserted in the secured home network 114. At block 820, the malware detection logic (e.g., 138) of the secured device (e.g., 136) may inform one or more other secured devices (e.g., 118*a*-118*n*) in the secured home network 114 to re-route messages through the malware detection logic (e.g., 138) of the new secured device (e.g., 136) in view of the identifier. At block 825, the malware detection logic (e.g., 138) of the secured device (e.g., 136) may receive a message intended for the unsecured device 132 from one of the one or more other secured devices (e.g., 118*a*) in the secured home network 114. At block 830, the malware detection logic (e.g., 138) of the secured device (e.g., 136) may execute a validation test on the message to determine whether the message includes malware.

If, at block 835, the malware detection logic (e.g., 138) of the secured device (e.g., 136) determines that the message does not include malware, then at block 840, the malware detection logic (e.g., 138) of the secured device (e.g., 136) may transmit the message over the secured home network 114 to the unsecured device 132. If, at block 835, the malware detection logic (e.g., 138) of the new secured device (e.g., 136) determines that the message does include malware, then at block 845, the malware detection logic (e.g., 138) of the new secured device (e.g., 136) does not transmit the message over the secured home network 114 to the unsecured device 132. The malware detection logic (e.g., 138) may be configured to report the presence of the new secured device (e.g., 136) to the cloud malware detection logic 110 of the cloud computing server 108.

The malware detection logic (e.g., 138) may transmit the message to the cloud malware detection logic 110 of the cloud computing server 108 and receive from the cloud malware detection logic 110 of the cloud computing server 108, an indication of whether the message includes malware.

Before the malware detection logic (e.g., 138) of the new secured device (e.g., 136) transmits the message, the malware detection logic (e.g., 138) of the secured device (e.g., 136) may be configured to encrypt the message.

The malware detection logic (e.g., 138) of secured device (e.g., 136) may conduct one or move validation tests comprising at least one of a port verification, content verification for virus detection, or a deep packet inspection for detection of known attacks.

The malware detection logic (e.g., 138) may transmit an indication of the presence of the malware to the cloud malware detection logic 110 of the cloud computing server 108.

Figure 9:
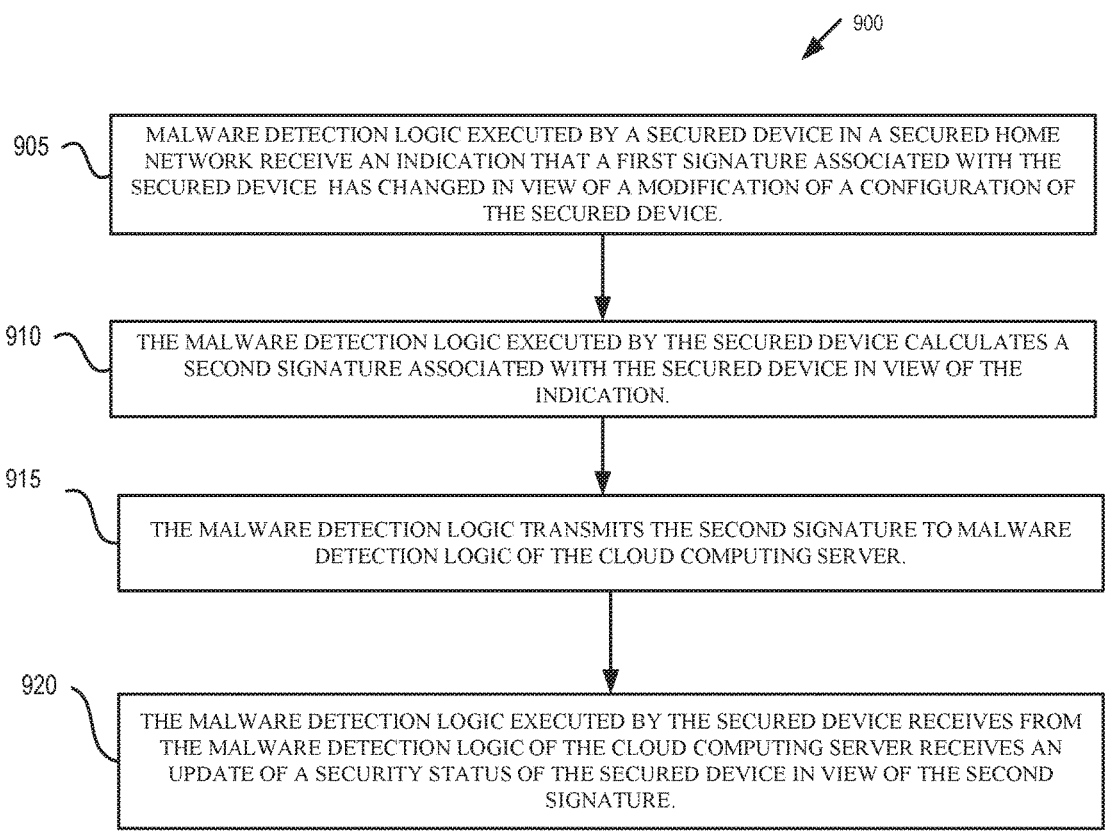
FIG. 9 is a diagram illustrating an exemplary method to configure a home network to respond to a modification of a configuration of a secured device (e.g., the gateway server) in the home network of FIG. 1.

FIG. 9 is a diagram illustrating an exemplary method 900 of a home network (secured home network 114) responding to a change in configuration of a secured device (e.g., the secured gateway 102) in the home network (e.g., the secured home network 114). The method 900 may be performed by malware detection logic (e.g., 104) executed by a processing device (e.g., of the secured gateway 102) of FIG. 1 and may comprise hardware (e.g., circuitry, dedicated logic, programmable logic, microcode, etc.), software (e.g., instructions run on a processing device), or a combination thereof.

As shown in FIG. 9, at block 905, the malware detection logic (e.g., 104) executed by a secured device (e.g., the secured gateway 102) in the secured home network 114 may receive an indication that a first signature associated with the secured device (e.g., of the secured gateway 102) has changed in view of a modification of a configuration of the secured device (e.g., the secured gateway 102). At block 910, the malware detection logic (e.g., 104) executed by a secured device (e.g., of the secured gateway 102) may calculate a second signature associated with the secured device (e.g., of the secured gateway 102) in view of the indication. At block 915, the malware detection logic (e.g., 104) may transmit the second signature to malware detection logic 110 of the cloud computing server 108. At block 920, the malware detection logic (e.g., 104) may receive from the malware detection logic 110 of the cloud computing server 108 an update of a security status of the secured device (e.g., the secured gateway 102) in view of the second signature.

The first signature may be determined based on a configuration of the secured device (e.g., of the secured gateway 102), one or more features of the secured device (e.g., of the secured gateway 102), or one or more behaviors of the secured device (e.g., of the secured gateway 102).

The malware detection logic 110 of the cloud computing server 108 may not permit further communications with the secured device (e.g., the secured gateway 102) in view of the updated security status.

The malware detection logic 110 of the cloud computing server 108 may inform other secured devices (e.g., 118a-118n) in the secured home network 114 about the change in security status of the secured device (e.g., the secured gateway 102). As a result, the other secured devices (e.g., 118a-118n) in the secured home network 114 may take individual actions. The individual action may lead to the malware detection logic 110 of the cloud computing server 108 not permitting any further communications (e.g., by the other secured devices (118a-118n) with the secured device that was modified (e.g., the secured gateway 102).

Figure 10:
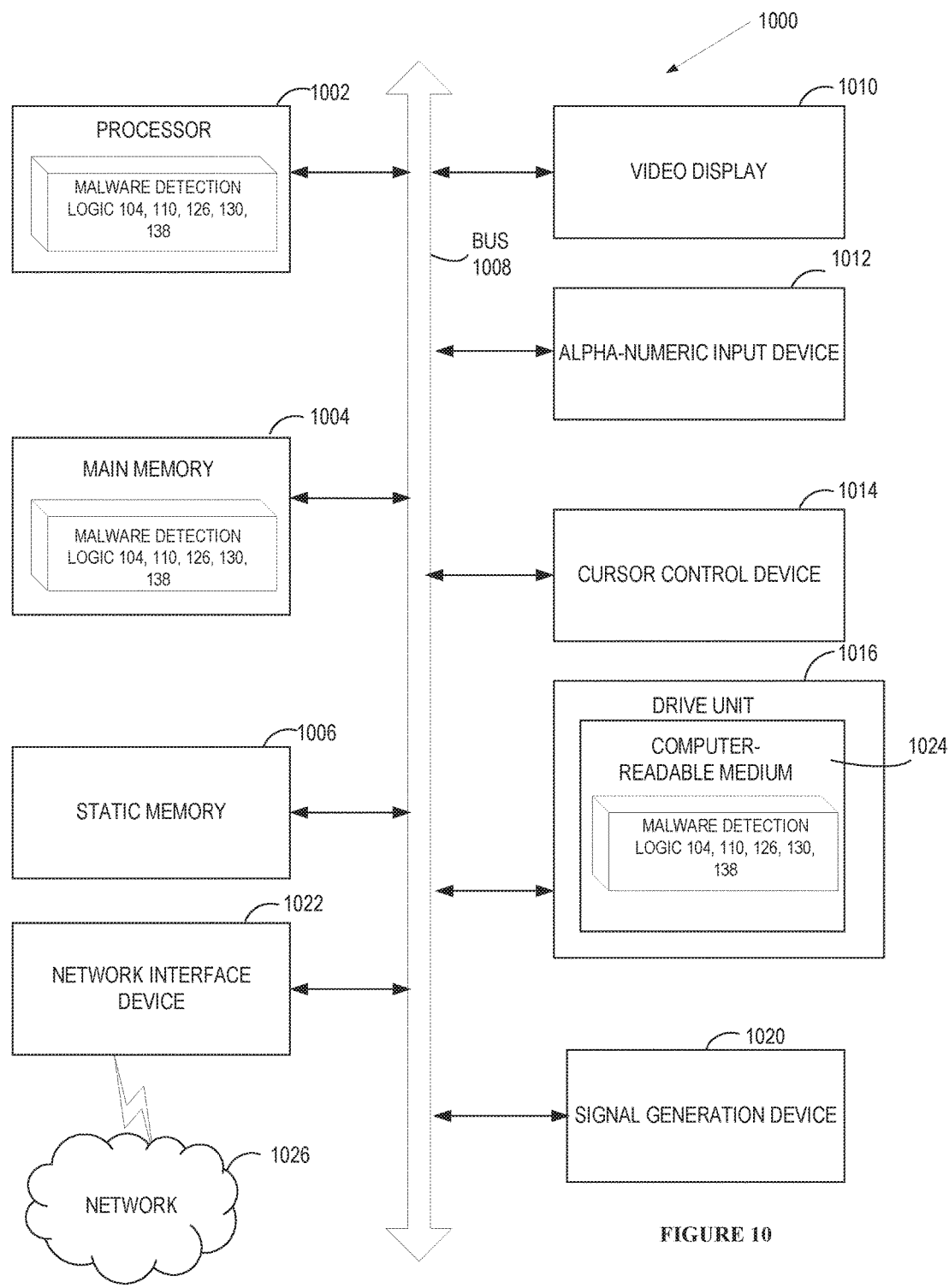
FIG. 10 illustrates a diagrammatic representation of a machine in the example form of a computer system within which a set of instructions, for causing the machine to perform any one or more of the methodologies discussed herein, may be executed.

FIG. 10 illustrates a diagrammatic representation of a machine in the example form of a computer system 1000 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processing device (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1008.

Processor 1002 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The malware detection logic 104, 110, 126, 130, 138 in FIGS. 1 and 3 may be executed by processor 1002 configured to perform the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

A drive unit 1016 may include a computer-readable medium 1024 on which is stored one or more sets of instructions (e.g., instructions of the malware detection logic 104, 110, 126, 130, 138 in FIGS. 1 and 3) embodying any one or more of the methodologies or functions described herein. The instructions of the malware detection logic 104, 110, 126, 130, 138 in FIGS. 1 and 3 may also reside, completely or at least partially, within the main memory 1004 and/or within the processor 1002 during execution thereof by the computer system 1000, the main memory 1004 and the processor 1002 also constituting computer-readable media. The instructions of the malware detection logic 104, 110, 126, 130, 138 in FIGS. 1 and 3 may further be transmitted or received over a network 1026 via the network interface device 1022.

While the computer-readable storage medium 1024 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The following examples pertain to further embodiments.

Example 1 is a method comprising receiving, by malware detection logic executed by a secured device residing in a home network, a message from an unsecured device of a first network and intended for a destination device of the home network, the destination device comprising a security client; establishing, by the malware detection logic, a secure communication channel between the malware detection logic of the secured device and the security client of the destination device; executing, by the malware detection logic, a validation test on the message to determine that the message includes malware; reporting, by the malware detection logic, an alarm to the security client of the destination device; transmitting, by the malware detection logic, information related to the malware to a cloud computing server; and preventing, by the malware detection logic, an application associated with the destination device from processing the message.

Example 2 may optionally extend the subject matter of example 1. In example 2, the method may further comprise before the transmitting, encrypting, by the malware detection logic, the message.

Example 3 may optionally extend the subject matter of any of examples 1-2. In example 3, the application resides on the secured device.

Example 4 may optionally extend the subject matter of any of examples 1-3. In example 4, determining that the message includes malware comprises conducting one or more validation tests comprising at least one of a port verification, content verification for virus detection, or a deep packet inspection for detection of known attacks.

Example 5 may optionally extend the subject matter of any of examples 1-4. In example 5, the method further comprises transmitting, by the malware detection logic, an indication of the presence of the malware to a cloud computing server.

Example 6 may optionally extend the subject matter of any of examples 1-5. In example 6, the method further comprises transmitting, by the malware detection logic, an alarm indicative of the presence of the malware to the security client of the destination device.

Example 7 may optionally extend the subject matter of any of examples 1-6. In example 7, the malware detection logic is to provide one or more of a secure booting process, a secure download process, or a generation process for generating one or more keys to encrypt the message.

Example 8 is a system comprising a memory to store instructions; and a processing device operatively coupled to the memory; the processing device residing in a home network, the processing device to: receive a message from an unsecured device of a first network and intended for a destination device of the home network, the destination device comprising a security client; establish a secure communication channel between the secured device and the security client of the destination device; execute a validation test on the message to determine that the message includes malware; report an alarm to the security client of the destination device; transmit information related to the malware to a cloud computing server; and prevent an application associated with the destination device from processing the message.

Example 9 is a method comprising receiving, by malware detection logic executed by a secured device residing in a home network, a message from an unsecured device of a first network and intended for a destination device of the home network, the destination device comprising a security client; responsive to the malware detection logic not determining whether the message includes malware: transmitting, by the malware detection logic, the message to a cloud computing server; responsive to receiving, from the cloud computing server, an indication that the message contains malware: reporting, by the malware detection logic, an alarm to the security client of the destination device; and preventing, by the malware detection logic, an application associated with the destination device from processing the message.

Example 10 may optionally extend the subject matter of example 9. In example 10, the method may further comprise before the transmitting, encrypting, by the malware detection logic, the message.

Example 11 may optionally extend the subject matter of any of examples 9-10. In example 11, the method may further comprise determining that the secured device has insufficient processing power or needs more expertise to determine whether the message includes malware.

Example 12 may optionally extend the subject matter of any of examples 9-11. In example 12, the method may further comprise receiving an indication that an alert level of the home network has increased.

Example 13 may optionally extend the subject matter of any of examples 9-12. In example 13, not determining whether the message includes malware is in view of the security sensitivity of the secured device.

Example 14 may optionally extend the subject matter of any of examples 9-13. In example 14, the application resides on the secured device.

Example 15 may optionally extend the subject matter of any of examples 9-14. In example 15, the method may further comprise conducting one or more validation tests comprising at least one of a port verification, content verification for virus detection, or a deep packet inspection for detection of known attacks.

Example 16 may optionally extend the subject matter of any of examples 9-15. In example 16, the method may further comprise transmitting, by the malware detection logic, an indication of the presence of the malware to a cloud computing server.

Example 17 may optionally extend the subject matter of any of examples 9-16. In example 17, the method may further comprise transmitting, by the malware detection logic, an alarm indicative of the presence of the malware to the security client of the destination device.

Example 18 may optionally extend the subject matter of any of examples 9-17. In example 18, the malware detection logic is to provide one or more of a secure booting process, a secure download process, or a generation process for generating one or more keys to encrypt the message.

Example 19 is a system comprising a memory to store instructions; and a processing operatively coupled to the memory; the processing device residing in a home network, the processing device to: receive a message from an unsecured device of a first network and intended for a destination device of the home network, the destination device comprising a security client; responsive to the malware detection logic not determining whether the message includes malware: transmit the message to a cloud computing server; responsive to receiving, from the cloud computing server, an indication that the message contains malware: report an alarm to the security client of the destination device; and prevent an application associated with the destination device from processing the message.

Example 20 may optionally extend the subject matter of example 19. In example 20, the system may further comprise the processing device to: before the transmitting, encrypt the message.

Example 21 is a method comprising receiving, by malware detection logic executed by a secured device residing in a home network, a message from an unsecured device of a first network, the message intended for a destination device of the home network, the destination device comprising a security client; establishing, by the malware detection logic, a secure communication channel with at least one of the unsecured device in view of a security level associated with the malware detection logic or a threat level associated with the message; receiving, by the malware detection logic, an indication that the at least one of the security level associated with the malware detection logic or the threat level associated with the message has changed; discontinuing a session associated with the secure communication channel in view of the indication; and preventing, by the malware detection logic, an application of the destination device from processing the message.

Example 22 may optionally extend the subject matter of example 21. In example 22, the method may further comprise before the transmitting, encrypting, by the malware detection logic, the message.

Example 23 may optionally extend the subject matter of any of examples 21-22. In example 23, the security level change is the result of one or more alarms triggered by the detection of the presence of malware in the message or a change in the home network requiring new authentication.

Example 24 may optionally extend the subject matter of any of examples 21-23. In example 24, the method may further comprise employing at least one of a session key creation mechanism, creating one or more certificates, a cloud-generated session key, or one or more home domain keys.

Example 25 may optionally extend the subject matter of any of examples 21-24. In example 25, malware detection logic reports the creation of the session to a cloud computing server. Example 26 may optionally extend the subject matter of any of examples 21-25. In example 26, the method may further comprise, giving approval, by the malware detection logic, to start the session.

Example 26 may optionally extend the subject matter of example 25. In example 26, giving approval is in view of a security level of the home network or a security sensitivity of the secured device.

Example 27 may optionally extend the subject matter of any of examples 21-25. In example 27, the malware detection logic is to provide one or more of a secure booting process, a secure download process, or a generation process for generating one or more keys to encrypt the message.

Example 28 is a system comprising a memory to store instructions; and a processing device operatively coupled to the memory; the processing device residing in a home network, processing device to: receive from an unsecured device of a first network, the message intended for a destination device of the home network, the destination device comprising a security client; establish a secure communication channel with at least one of the unsecured device in view of a security level associated with the malware detection logic or a threat level associated with the message; receive an indication that the at least one of the security level associated with the malware detection logic or the threat level associated with the message has changed; discontinue a session associated with the secure communication channel in view of the indication; and prevent an application of the destination device from processing the message.

Example 29 is a method comprising receiving, by malware detection logic executed by an existing secured device residing in a home network, an identifier associated with an unsecured device inserted in the home network; informing, by the malware detection logic, one or more other secured devices in the home network to re-route messages through the malware detection logic of the secured device in view of the identifier; receiving, by the malware detection logic, a message intended for the unsecured device from one of the one or more other secured devices in the home network; executing, by the malware detection logic, a validation test on the message to determine whether the message includes malware; and responsive to the malware detection logic detecting that the message does not include malware: transmitting, by the malware detection logic, the message over the home network to the unsecured device.

Example 30 may optionally extend the subject matter of example 29. In example 30, the method may further comprise wherein executing a validation test further comprises: transmitting the message to a cloud computing server; and receiving, by the malware detection logic from the cloud computing server, an indication of whether the message includes malware.

Example 31 may optionally extend the subject matter of any of examples 29-30. In example 30, the method may further comprise before the transmitting, encrypting, by the malware detection logic, the message.

Example 32 may optionally extend the subject matter of any of examples 29-31. In example 32, the method may further comprise conducting one or move validation tests comprising at least one of a port verification, content verification for virus detection, or a deep packet inspection for detection of known attacks.

Example 33 may optionally extend the subject matter of any of examples 29-32. In example 33, the method may further comprise transmitting, by the malware detection logic, an indication of the presence of the malware to a cloud computing server.

Example 34 may optionally extend the subject matter of any of examples 29-33. In example 34, the malware detection logic is to provide one or more of a secure booting process, a secure download process, or a generation process for generating one or more keys to encrypt the message.

Example 35 is a system comprising a memory to store instructions; and a processing device operatively coupled to the memory; the processing device residing in a home network, the processing device to: receive an identifier associated with an unsecured device inserted in the home network; inform one or more other secured devices in the home network to re-route messages through the malware detection logic of the secured device in view of the identifier; receive a message intended for the unsecured device from one of the one or more other secured devices in the home network; execute a validation test on the message to determine whether the message includes malware; and responsive to detecting that the message does not include malware: transmit the message over the home network to the unsecured device.

Example 36 is a method comprising inserting an unsecured device in a home network; adding a new secured device having malware detection logic in the home network; receiving, by the malware detection logic, an identifier associated with the unsecured device inserted in the home network; informing, by the malware detection logic, one or more other secured devices in the home network to re-route messages through the malware detection logic of the new secured device in view of the identifier; receiving, by the malware detection logic, a message intended for the unsecured device from one of the one or more other secured devices in the home network; executing, by the malware detection logic, a validation test on the message to determine whether the message includes malware; and responsive to the malware detection logic detecting that the message does not include malware: transmitting, by the malware detection logic, the message over the home network to the unsecured device.

Example 37 may optionally extend the subject matter of example 36. In example 37, the method may further comprise wherein: responsive to the malware detection logic detecting that the message includes malware, not transmitting, by the malware detection logic, the message over the home network to the unsecured device.

Example 38 may optionally extend the subject matter of any of examples 36-37. In example 38, the method may further comprise reporting, by the malware detection logic, the presence of the processing device to a cloud computing server.

Example 39 may optionally extend the subject matter of any of examples 36-38. In example 39, executing a validation test further comprises: transmitting the message to a cloud computing server; and receiving, by the malware detection logic from the cloud computing server, an indication of whether the message includes malware.

Example 40 may optionally extend the subject matter of any of examples 36-39. In example 40, the method may further comprise before the transmitting, encrypting, by the malware detection logic, the message.

Example 41 may optionally extend the subject matter of any of examples 36-40. In example 41, the method may further comprise conducting one or move validation tests comprising at least one of a port verification, content verification for virus detection, or a deep packet inspection for detection of known attacks.

Example 42 may optionally extend the subject matter of any of examples 36-41. In example 42, the method may further comprise transmitting, by the malware detection logic, an indication of the presence of the malware to a cloud computing server.

Example 43 may optionally extend the subject matter of any of examples 36-42. In example 43, the malware detection logic is to provide one or more of a secure booting process, a secure download process, or a generation process for generating one or more keys to encrypt the message.

Example 44 is a system comprising a secured device having malware detection logic added to a home network; an unsecured device inserted in the home network; a memory to store instructions; and a processing device operatively coupled to the memory; the processing device residing in the secured device of a home network, the processing device to: receive an identifier associated with the unsecured device inserted in the home network; inform one or more other secured devices in the home network to re-route messages through the malware detection logic of the new secured device in view of the identifier; receive a message intended for the unsecured device from one of the one or more other secured devices in the home network; execute a validation test on the message to determine whether the message includes malware; and responsive to detecting that the message does not include malware: transmit the message over the home network to the unsecured device.

Example 45 is a method comprising receiving, by malware detection logic executed by a secured device in a home network, an indication that a first signature associated with the secured device has changed in view of a modification of a configuration of the trusted first device; calculating, by the malware detection logic of the secured device a second signature associated with the secured device in view of the indication; transmitting, by the malware detection logic, the second signature to a cloud computing server; and receiving, by the malware detection logic from the cloud computing server, an update of a security status of the secured device in view of the second signature.

Example 46 may optionally extend the subject matter of example 45. In example 46, the first signature is determined in view of at least one of a configuration of the secured device, one or more features of the secured device, or one or more behaviors of the secured device.

Example 47 may optionally extend the subject matter of any of examples 45-46. In example 47, receiving an update of a security status comprises not permitting further communications with the secured device.

Example 48 is a system comprising a memory to store instructions; a processing device operatively coupled to the memory; and the processor residing in a home network, the processing device to: receive an indication that a first signature associated with the secured device has changed in view of a modification of a configuration of the trusted first device; calculate a second signature associated with the secured device in view of the indication; transmit the second signature to a cloud computing server; and receive, from the cloud computing server, an update of a security status of the secured device in view of the second signature.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

Accordingly, an efficient method and system provides protection to home networks. Innovation resides in the use of cloud computing server and groups of devices having malware detection logic to increase the capability of detecting attacks and intrusions and preventing the attacks and intrusions. The development of dedicated device malware detection logic helps in securing devices that are exposed, such as Internet of Things (IoT) devices (e.g., webcams, media devices, etc.).

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, by malware detection logic executed by a secured device residing in a home network, a message from an unsecured device of a first network and intended for a destination device of the home network, the destination device comprising a security client;
determining, by the malware detection logic and based on a characteristic of the secured device, not to detect whether the message includes malware, the characteristic including at least a processing capability of the secured device;
responsive to the malware detection logic determining not to detect whether the message includes malware, transmitting, by the malware detection logic, the message to a cloud computing server;
responsive to receiving, from the cloud computing server, an indication that the message includes malware:
reporting, by the malware detection logic, an alarm to the security client of the destination device; and
preventing, by the malware detection logic, an application associated with the destination device from processing the message.

2. The method of claim 1, further comprising encrypting, by the malware detection logic, the message before transmitting the message to the cloud computing server.

3. The method of claim 1, further comprising determining that the secured device has insufficient processing power or needs more expertise to determine whether the message includes malware, wherein determining not to detect whether the message includes malware is based on at least one of the secured device having insufficient processing power or the secured device needing more expertise to determine whether the message includes malware.

4. The method of claim 1, further comprising receiving an indication that an alert level of the home network has increased.

5. The method of claim 1, wherein the characteristic of the secured device further includes at least a security sensitivity of the secured device, and wherein determining not to detect whether the message includes malware is based on the security sensitivity of the secured device.

6. The method of claim 1, wherein the application resides on the secured device.

7. The method of claim 1, further comprising:
receiving, by the malware detection logic, an additional message; and
conducting, by the malware detection logic for the additional message, one or more validation tests comprising at least one of a port verification, content verification for virus detection, or a deep packet inspection for detection of known attacks.

8. The method of claim 1, further comprising:
receiving, by the malware detection logic, an additional message;
determining, by the malware detection logic, that the additional message includes malware; and
transmitting, by the malware detection logic, an indication of a presence of the malware to the cloud computing server.

9. The method of claim 1, wherein the alarm is indicative of a presence of the malware.

10. The method of claim 1, wherein the malware detection logic is configured to provide one or more of a secure booting process, a secure download process, or a generation process for generating one or more keys to encrypt the message.

11. A system comprising:
a memory to store instructions; and
a processing device operatively coupled to the memory, the processing device residing in a home network, the processing device being configured to:
receive a message from an unsecured device of a first network and intended for a destination device of the home network, the destination device comprising a security client;
determine, based on a characteristic of the system, not to detect whether the message includes malware, the characteristic including at least a processing capability of the system;
responsive to a malware detection logic determining not to detect whether the message includes malware, transmit the message to a cloud computing server;
responsive to receiving, from the cloud computing server, an indication that the message includes malware:
report an alarm to the security client of the destination device; and
prevent an application associated with the destination device from processing the message.

12. The system of claim 11, wherein the processing device is further configured to encrypt the message before transmitting the message to the cloud computing server.

13. The system of claim 11, wherein the processing device is further configured to determine that the system has insufficient processing power or needs more expertise to determine whether the message includes malware, wherein determining not to detect whether the message includes malware is based on at least one of the system having insufficient processing power or the system needing more expertise to determine whether the message includes malware.

14. The system of claim 11, wherein the characteristic of the secured device further includes at least a security sensitivity of the secured device, and wherein determining not to detect whether the message includes malware is based on the security sensitivity of the secured device.

15. The system of claim 11, wherein the application resides on the system.

16. The system of claim 11, wherein the processing device is further configured to determine:
receive, by the malware detection logic, an additional message;
determine, by the malware detection logic, that the additional message includes malware; and
transmit, by the malware detection logic, an indication of a presence of the malware to a cloud computing server.

17. The system of claim 11, wherein the malware detection logic is configured to provide a generation process for generating one or more keys to encrypt the message.

18. A system comprising:
a home network;
a secured device comprising a memory and a processing device operatively coupled to the home network, wherein the processing device of the secured device is configured to:
receive, by malware detection logic executed by the processing device, a message from an unsecured device of a first network and intended for a destination device of the home network, the destination device comprising a security client;
determine, by the malware detection logic and based on a characteristic of the secured device, not to detect whether the message includes malware, the characteristic including at least a processing capability of the secured device;

responsive to the malware detection logic determining not to detect whether the message includes malware, transmit, by the processing device, the message to a cloud computing server;

responsive to receipt, from the cloud computing server, of an indication that the message includes malware:
report, by the processing device, an alarm to the security client of the destination device; and
prevent, by the processing device, an application associated with the destination device from processing the message.

19. The system of claim 18, wherein the processing device is further configured to determine that the secured device has insufficient processing power or needs more expertise to determine whether the message includes malware, wherein determining not to detect whether the message includes malware is based on at least one of the secured device having insufficient processing power or the secured device needing more expertise to determine whether the message includes malware.

20. The system of claim 18, wherein the characteristic of the secured device further includes at least a security sensitivity of the secured device, and wherein determining not to detect whether the message includes malware is based on the security sensitivity of the secured device.

21. The system of claim 18, wherein the malware detection logic is configured to provide one or more of a secure booting process for generating one or more keys to encrypt the message.

* * * * *